United States Patent
Lien et al.

(10) Patent No.: US 7,925,152 B2
(45) Date of Patent: Apr. 12, 2011

(54) EXPOSURE CONTROL METHOD

(75) Inventors: Kuo-Chin Lien, Chung-Ho (TW); Chun-Hung Shen, Chung-Ho (TW)

(73) Assignee: Vatics, Inc., Chung-Ho (TW)

( * ) Notice: Subject to any disclaimer, the term of this patent is extended or adjusted under 35 U.S.C. 154(b) by 0 days.

(21) Appl. No.: 12/456,201

(22) Filed: Jun. 11, 2009

(65) Prior Publication Data

US 2009/0310955 A1 Dec. 17, 2009

(30) Foreign Application Priority Data

Jun. 11, 2008 (TW) ................................ 97121631 A

(51) Int. Cl.
*G03B 7/00* (2006.01)
*H04N 5/238* (2006.01)

(52) U.S. Cl. ........................................ 396/213; 348/364
(58) Field of Classification Search .................. 396/213; 348/364

See application file for complete search history.

(56) References Cited

U.S. PATENT DOCUMENTS

| | | |
|---|---|---|
| 6,075,875 A | 6/2000 | Gu |
| 6,141,433 A | 10/2000 | Moed et al. |
| 6,999,620 B1 | 2/2006 | Harville |
| 2004/0066460 A1* | 4/2004 | Kondo et al. ............. 348/222.1 |
| 2005/0157204 A1* | 7/2005 | Marks ........................ 348/370 |
| 2007/0110427 A1* | 5/2007 | Tsai .......................... 396/166 |

* cited by examiner

*Primary Examiner* — Rodney E Fuller
(74) *Attorney, Agent, or Firm* — Liu & Liu

(57) ABSTRACT

An exposure control method adjusts an exposure setting used for capturing an image including a foreground object and a background. The foreground object is extracted from the image by an object detection procedure. If the area of the foreground object is greater than a predetermined area value, the brightness of both the foreground object and the background is analyzed. On the contrary, if the area of the foreground object is not greater than the predetermined area value, only the brightness of the background is analyzed. The exposure setting is adjusted according to the analysis result. Accordingly, greater brightness stability is provided during the capture of the following images.

19 Claims, 4 Drawing Sheets

EXPOSURE CONTROL METHOD

FIELD OF THE INVENTION

The present invention relates to an exposure control method for adjusting brightness of images, and more particularly to an automatic exposure control method based on object detection.

BACKGROUND OF THE INVENTION

In photography, exposure is the total amount of light allowed to fall on the photographic medium (photographic film or image sensor) during the process of taking a photograph. To avoid overexposed or underexposed, exposure should be adjusted to control the amount of light from the subject. Nowadays, most cameras can be operated in an automatic exposure mode to automatically calculate and adjust exposure settings in order to properly capture images. The exposure settings include exposure time and illumination level, controlled by shutter speed and lens aperture, respectively. Slower shutter speeds (longer exposure time) and greater lens apertures (admitting more light) result in greater exposures.

Please refer to FIG. 1, a flowchart illustrating the conventional exposure control method. At the beginning, an image is captured (step 102). Then the system analyzes brightness of the entire image (step 104). If the analysis result is unsatisfactory or unacceptable, the system adjusts the exposure settings to be used for the next capture (step 106). For example, if the image is too bright, the system may shorten the shutter time or decrease the lens aperture or take both. Hence, the next photographing receives less light to make the next image a little dark.

Unfortunately, the brightness estimation is easily affected so as to possibly obtain inaccurate estimation. For example, when a certain volume of dark or bright object is passing the front of the photographic apparatus, the apparatus usually mistakes for change in light source and automatically adjusts the exposure settings. Please refer to FIG. 2 illustrating such case. In the image 200, a person 206 in a white T-shirt 208 and white trousers 210 is walking on a dark floor 204. A black bag 202 is placed on the floor 204. When the person 206 is moving close to the bag 202, the conventional exposure control method considers that the light source is changing. Hence, the exposure settings are adjusted during the moving of the person 206. In fact, the light source is unchanged. The inaccurate estimation and unnecessary adjustment incur an instable brightness, which adversely affects the quality of the photographing.

Therefore, there is a need of providing an improved exposure control method for automatically and properly adjusting the exposure settings during each photographing. It is desired that the moving of a dark or bright object is detectable and a proper control is made according to the detection.

SUMMARY OF THE INVENTION

The present invention provides an exposure control method for adjusting exposure settings for capturing an image including a foreground object and a background. The foreground object is extracted from the image by an object detection procedure. If the area of the foreground object is greater than a predetermined area value, the brightness of both the foreground object and the background is analyzed. On the contrary, if the area of the foreground object is not greater than the predetermined area value, only the brightness of the background is analyzed. The exposure setting is adjusted according to the analysis result. Accordingly, greater brightness stability is provided during the capture of the following images.

In an embodiment, if the foreground object is still, the brightness analysis does not ignore the foreground object.

In an embodiment, the exposure settings include exposure time and lens aperture. By decreasing the exposure time and lens aperture, the exposure amount reduces. On the contrary, by increasing the exposure time and lens aperture, the exposure amount raises.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
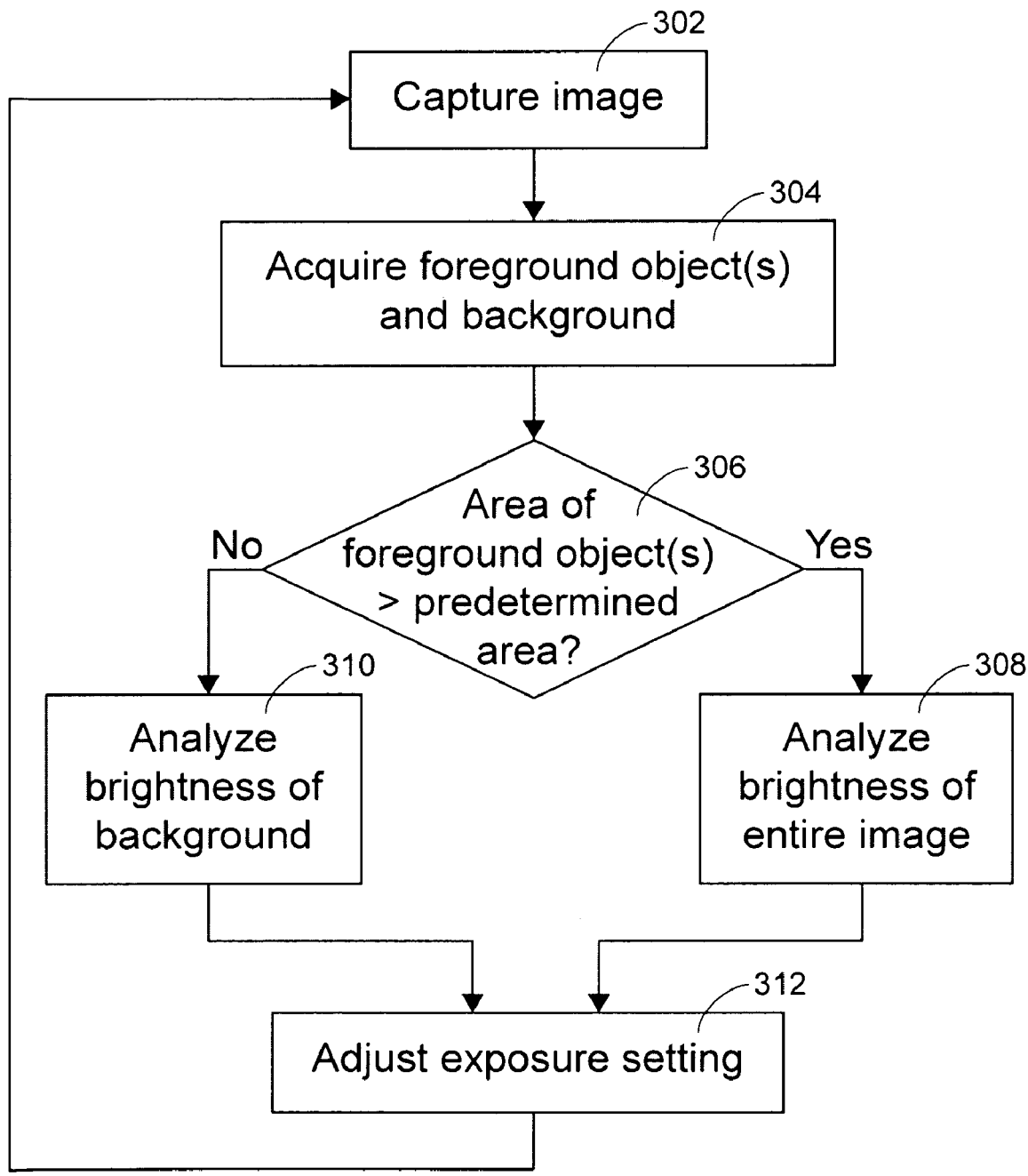
FIG. 3 is a flowchart illustrating a preferred embodiment of an exposure control method according to the present invention.

Please refer to FIG. 3, a flowchart illustrating a preferred embodiment of an exposure control method according to the present invention. At the beginning, an image is captured (step 302). Then an object detection procedure is performed to acquire foreground object(s) and background from the image (step 304). According to the present invention, the method considers the influence degree of the foreground object(s) to determine the exposure adjustment. The judgment standard may be the area of each foreground object or overall area of the foreground object(s) (step 306). The area may be expressed as an area value or an area percentage in the image. If the foreground object is big enough to affect the brightness of the image, the foreground object should be taken into account. Hence, the brightness of the entire image is analyzed (step 308) to determine whether the brightness is proper or not. The method adjusts the exposure settings, for example exposure time or lens aperture according to the analysis result, so as to increase or decrease exposure to meet the brightness requirement (step 312). On the contrary, if the foreground object is considered to be insignificant and negligible, the brightness analysis neglects the foreground object. The method analyzes the brightness of only the background rather than the entire image (step 310). The exposure settings are adjusted according to the brightness analysis result (step 312). For example, if the background is too bright, the method shortens the shutter time or decreases the lens aperture or takes both. Hence, the next photographing receives less light to make the next image a little dark.

In the case of multiple foreground objects, the judgment standard may be focused on each foreground object or all of the foreground objects. There are some possible applications. In an embodiment, if any foreground object has an area greater than the predetermined area, all of the foreground objects are taken into consideration in the brightness analysis. In another embodiment, only the foreground having an area greater than the predetermined area is taken into consideration in the brightness analysis. In a further embodiment, if a foreground object is not moving, the foreground object may be integrated into the background for the brightness analysis. The selection is made according to the practical applications.

Figure 1:
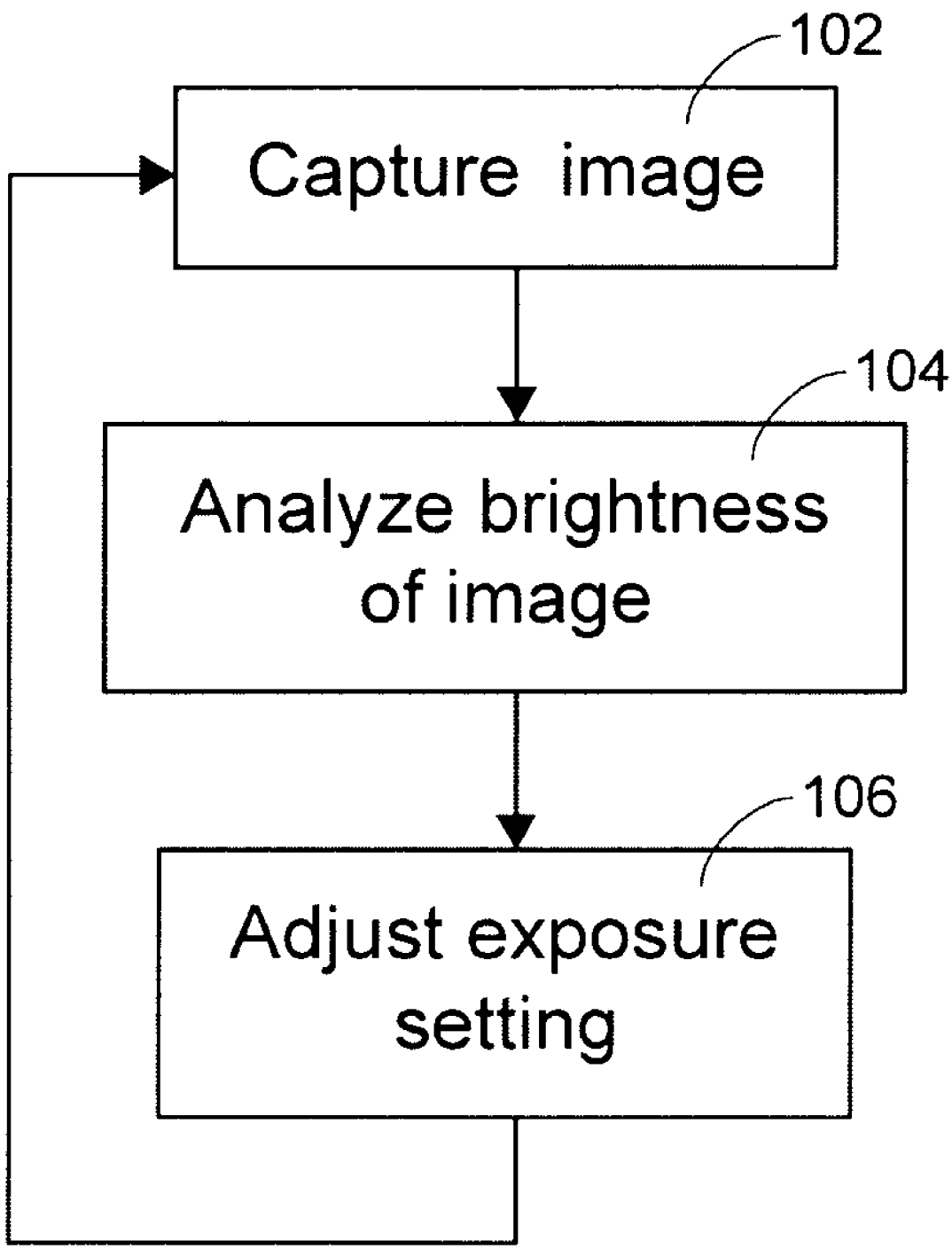
FIG. 1 is a flowchart illustrating the conventional exposure control method.
Figure 2:
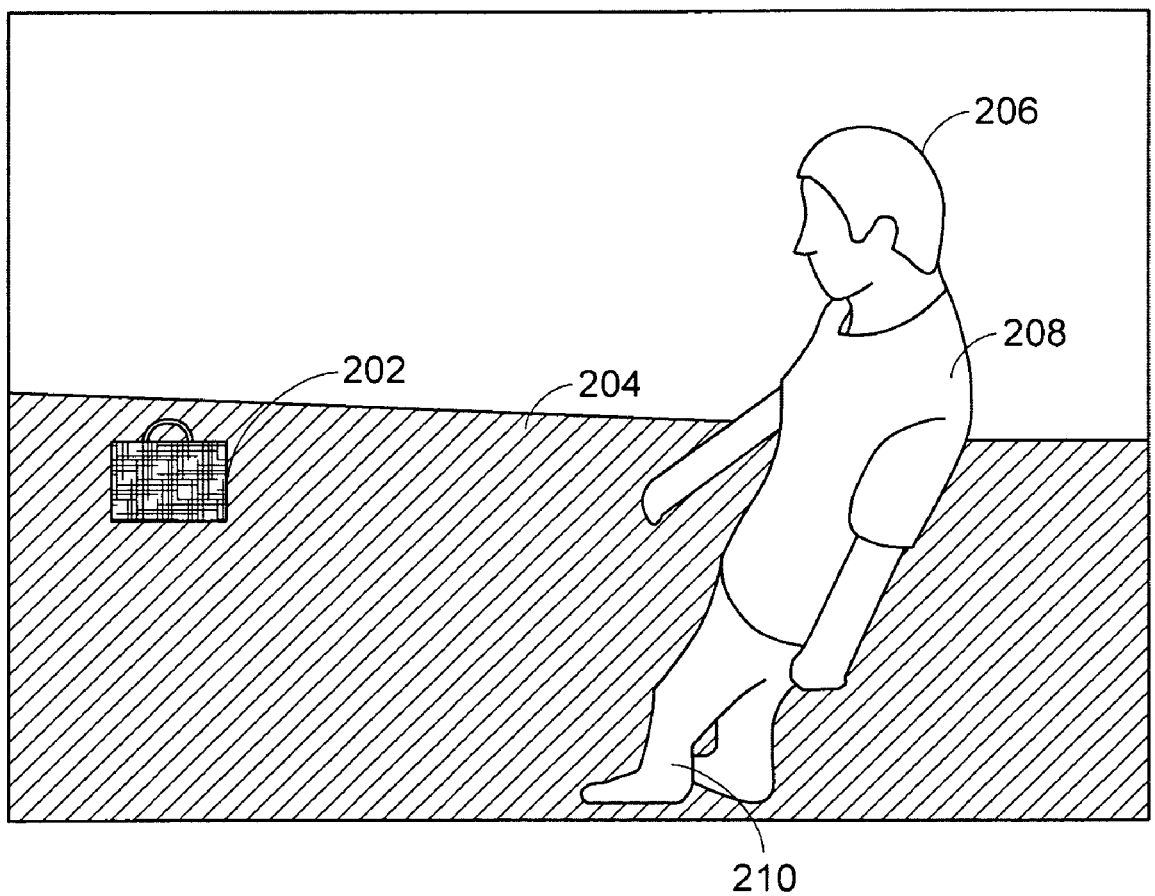
FIG. 2 illustrates an exemplifying image whose exposure settings are usually erroneously adjusted by the conventional exposure control method.

The present exposure control method is applied to the image 200 of FIG. 2 for further explanation. The method detects that the person 206 in the white T-shirt and white trousers 210 and the bag 202 are foreground objects. Since the areas of the person 206 and the bag 202 are not greater than a predetermined value (maybe 20% of the image), the brightness analysis neglects the person 206 and the bag 202. Hence, according to the present exposure control method, only a brightness change in the background will affect the exposure settings. The brightness stability of the captured images is thus enhanced. When the person 206 moves close to the camera, the area of the person 206 increases to occupy a certain area of the image. Under this condition, in addition to the background, the brightness analysis involves the person 206 (or the bag 202) because the foreground object is of great weighting and indeed affects the image.

Figure 4:
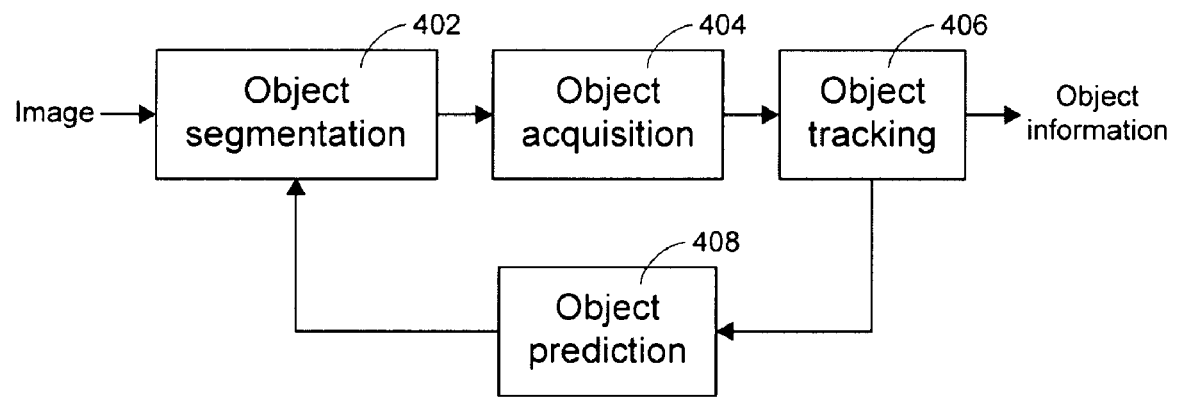
FIG. 4 is a block diagram illustrating a possible object detection procedure applied to the exposure control method.

From the above description, it is to be noted that properly separating the foreground object(s) from the background is essential to the present exposure control method. There are several known approaches for extracting the foreground pixels from the image, for example frame difference, region merge and background subtraction. Since background subtraction has the highest reliability, it may be used for detecting the foreground object in the image to find the area thereof A more reliable procedure to extract foreground object from the image is described herein. This object detection procedure can be applied to the present exposure control method to reach better control performance. Please refer to FIG. 4, a block diagram illustrating the object detection procedure. The object detection procedure includes an object segmentation block 402, an object acquisition block 404, an object tracking block 406 and an object prediction block 408. The object prediction block 408 generates prediction information of foreground objects to indicate the possible positions and sizes of the foreground objects in the next image. Accordingly, the object segmentation block 402 obtains a binary mask by considering the current image and the prediction information of the existing foreground objects. If one pixel is located in the predicted regions of the foreground objects, the object segmentation block 402 increases the probability that the pixel is determined as a foreground pixel in the current image. The pixels in the current image can be assigned with different segmentation sensitivities to obtain a proper binary mask which accurately distinguishes the foreground pixels from the background pixels.

Then, the binary mask is processed by the object acquisition block 404 to collect the features of the foreground pixels and grouping related foreground pixels into foreground objects. A typical method for acquiring foreground objects is connected component labeling algorithm. At this stage, the feature of each segmented foreground object, for example color distribution, center of mass and size, is calculated. At last, the foreground objects in different images are tracked by the object tracking block 406 by comparing the acquired features of corresponding foreground objects in sequential images to realize their changes in appearances and positions. The analysis results are outputted and the object information such as object speed, object species and object interaction is thus received. The analysis results are also processed by the object prediction block 408 to get the prediction information for the segmentation of the next image.

The sensitivity and the threshold value for object segmentation are variable along the entire image. If the pixel is supposed to be a foreground pixel, the threshold value for this pixel decreases to raise the sensitivity of the segmentation procedure. Otherwise, if the pixel is supposed to be a background pixel, the threshold value for this pixel increases to lower the sensitivity of the segmentation procedure.

From the above description, the object prediction information fed back to the object segmentation block 402 affects the controllable threshold value very much. Some object prediction information is explained herein. The object prediction information may include object motion information, object species information, environment information, object depth information, interaction information, etc.

Object motion information includes speed and position of the foreground object. It is basic information associated with other object prediction information.

Object species information indicates the species of the foreground object, for example a car, a bike or a human. It is apparent that the predicted speed is from fast to slow in this order. Furthermore, a human usually has more irregular moving track than a car. Hence, for a human, more historical images are required to analyze and predict the position in the next image.

Environment information indicates where the foreground object is located. If the foreground object is moving down a hill, the acceleration results in an increasing speed. If the foreground object is moving toward a nearby exit, it may predict that the foreground object disappears in the next image and no predict position is provided for the object segmentation block.

Object depth information indicates a distance between the foreground object and the camera. If the foreground object is moving toward the camera, the size of the object becomes bigger and bigger in the following images. On the contrary, if the foreground object is moving away from the camera, the foreground object is of smaller and smaller size.

Interaction information is high-level and more complicated information. For example, one person is moving behind a pillar. The person temporarily disappears in the images. The object prediction block can predict the moving after he appears again according to the historical images before his walking behind the pillar.

The object motion information is taken as an example for further description. The position and motion vector of foreground object k at time t is respectively expressed as Pos(Obj(k), t) and MV(Obj(k), t).

$$MV(\mathrm{Obj}(k), t) = \mathrm{Pos}(\mathrm{Obj}(k), t) - \mathrm{Pos}(\mathrm{Obj}(k), t-1) \quad (1)$$

A motion prediction function MP(Obj(k), t) is defined as:

$$MP(\mathrm{Obj}(k), t) = (MV(\mathrm{Obj}(k), t) + MV(\mathrm{Obj}(k), t-1) + MV(\mathrm{Obj}(k), t-2) + \ldots)_{low\_pass} \quad (2)$$

A low pass filter is used in the above equation to filter out the possible noise. Accordingly, the predicted position of the foreground object Predict_pos(Obj(k), t+1) may be obtained by adding the motion prediction function to the current position as the following equation:

$$\mathrm{Predict\_pos}(\mathrm{Obj}(k), t+1) = \mathrm{Pos}(\mathrm{Obj}(k), t) + MP(\mathrm{Obj}(k), t) \quad (3)$$

Thus, pixels within the prediction region of the foreground object are preliminarily considered as foreground pixels.

This object detection procedure utilizes the prediction information of foreground objects to facilitate the segmentation determination of the pixels. The variable threshold value flexibly adjusts the segmentation sensitivities along the entire image so as to increases the accuracy of object segmentation. It is particularly applicable to the present exposure control method because of the accurate object detection ability.

In summary, the present exposure control method takes advantage of object detection technique to distinguish the foreground object from the background. The brightness analysis of the entire image is conditional on the great weighting of the foreground object. The present exposure control method efficiently reduces the influence of insignificant (moving) objects. Hence, the brightness stability of images is improved because proper exposure settings are obtained according to the present exposure control method.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exposure control method, comprising steps of:
   receiving an image;
   extracting a foreground object and a background from the image;
   calculating an area of the foreground object;
   comparing the area of the foreground object with a predetermined area value; and
   adjusting an exposure setting according to the comparing result and the background.

2. The exposure control method according to claim 1 wherein the exposure setting is adjusted according to the brightness of the background when the calculated area of the foreground object is not greater than the predetermined area value, and the exposure setting is adjusted according to the brightness of the foreground object and the background when the calculated area of the foreground object is greater than the predetermined area value.

3. The exposure control method according to claim 2 wherein the exposure setting is an exposure time, and the adjusting step is executed by decreasing the exposure time to decrease the brightness of the image or increasing the exposure time to increase the brightness of the image.

4. The exposure control method according to claim 2 wherein the exposure setting is a lens aperture, and the adjusting step is executed by decreasing the lens aperture to decrease the brightness of the image or increasing the lens aperture to increase the brightness of the image.

5. The exposure control method according to claim 1 wherein the image comprises a plurality of foreground objects, the exposure control method further comprising steps of:
   analyzing the brightness of the background when the area of each of the plurality of the foreground objects is not greater than the predetermined area value; and
   analyzing the brightness of the image when the area of one of the plurality of the foreground objects is greater than the predetermined area.

6. The exposure control method according to claim 1, further comprising a step of analyzing the brightness of the background and the foreground object when the foreground object is still.

7. The exposure control method according to claim 1 wherein the extracting step is performed by a background subtraction approach.

8. The exposure control method according to claim 1 wherein the extracting step further comprises steps of:
   receiving prediction information of the foreground object;
   adjusting a segmentation sensitivity for each pixel according to the prediction information;
   for each pixel, determining whether the pixel is a foreground pixel or background pixel according to a property of the pixel by considering the segmentation sensitivity corresponding to the pixel; and
   grouping a plurality of related foreground pixels into the foreground object.

9. The exposure control method according to claim 8 wherein the prediction information indicates that a portion of pixels in the image are predicted foreground pixels.

10. The exposure control method according to claim 9 wherein the segmentation sensitivity of a selected pixel increases when the selected pixel is one of the predicted foreground pixels.

11. The exposure control method according to claim 9 wherein the segmentation sensitivity of a selected pixel decreases when the selected pixel is not one of the predicted foreground pixels.

12. The exposure control method according to claim 8, further comprising a step of calculating object information of the foreground object.

13. The exposure control method according to claim 12 wherein the object information is one selected from a group consisting of color distribution, center of mass, size and a combination thereof.

14. The exposure control method according to claim 13 wherein the foreground object is tracked according to a change in the object information between different images to get motion information of the foreground object.

15. The exposure control method according to claim 14 wherein the motion information includes moving speed and moving direction of the foreground object.

16. The exposure control method according to claim 15 wherein the prediction information of the foreground object is generated according to the motion information.

17. The exposure control method according to claim 1, wherein the foreground object comprises a moving object.

18. An exposure control method, comprising steps of:
   receiving an image;
   extracting a moving object and a background from the image;
   calculating an area of the moving object;
   comparing the area of the moving object with a predetermined area value; and
   adjusting an exposure setting according to the comparing result and the background.

19. The exposure control method according to claim 18 wherein the exposure setting is adjusted according to the brightness of the background when the calculated area of the moving object is not greater than the predetermined area value, and the exposure setting is adjusted according to the brightness of the moving object and the background when the calculated area of the moving object is greater than the predetermined area value.

* * * * *